United States Patent
Kiyomoto et al.

(10) Patent No.: US 7,708,821 B2
(45) Date of Patent: *May 4, 2010

(54) AQUEOUS INK FOR INKJET RECORDING

(75) Inventors: Hiroshi Kiyomoto, Hiratsuka (JP);
Masashi Hiroki, Yokohama (JP);
Takaya Kitawaki, Mishima (JP); Ryozo Akiyama, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/152,461

(22) Filed: May 14, 2008

(65) Prior Publication Data

US 2008/0282932 A1 Nov. 20, 2008

(30) Foreign Application Priority Data

May 18, 2007 (JP) .............................. 2007-133021

(51) Int. Cl.
*C09D 11/02* (2006.01)

(52) U.S. Cl. .............. 106/31.86; 106/31.89; 106/31.65; 106/31.75; 106/31.78; 106/31.87

(58) Field of Classification Search .............. 106/31.86, 106/31.89, 31.65, 31.75, 31.78, 31.87
See application file for complete search history.

(56) References Cited

U.S. PATENT DOCUMENTS

| | | | | |
|---|---|---|---|---|
| 5,156,675 | A | | 10/1992 | Breton et al. ............ 106/31.58 |
| 5,952,414 | A | * | 9/1999 | Noguchi et al. ............. 524/377 |
| 6,004,389 | A | * | 12/1999 | Yatake .................... 106/31.86 |
| 6,048,914 | A | * | 4/2000 | Goto et al. ................ 106/31.89 |
| 6,051,629 | A | * | 4/2000 | Ichikawa et al. .......... 106/31.89 |
| 6,508,870 | B1 | * | 1/2003 | Komatsuzawa et al. .. 106/31.86 |
| 7,071,245 | B2 | * | 7/2006 | Ichikawa .................... 523/161 |
| 7,074,843 | B2 | * | 7/2006 | Nakamura et al. .......... 523/205 |
| 7,556,681 | B2 | * | 7/2009 | Sasaki et al. ............. 106/31.86 |
| 2004/0242726 | A1 | * | 12/2004 | Waki et al. .................. 523/160 |
| 2008/0276833 | A1 | * | 11/2008 | Sasaki et al. ............. 106/31.13 |

FOREIGN PATENT DOCUMENTS

| | | |
|---|---|---|
| EP | 1041127 | * 10/2000 |
| JP | 09-111165 | 4/1997 |
| JP | 2005-104139 | 4/2005 |
| JP | 2008-303380 | 12/2008 |

* cited by examiner

*Primary Examiner*—Helene Klemanski
(74) *Attorney, Agent, or Firm*—Harness, Dickey & Pierce, P.L.C.

(57) ABSTRACT

An aqueous ink for inkjet recording is provided, which includes water, pigment, a water-soluble organic solvent incorporated at a content of not less than 30% by weight, a surfactant, and 3-methoxy-3-methyl-1-butanol. The surfactant is formed of at least one selected from the group consisting of acetylene glycol-based surfactant and a fluorinated surfactant.

19 Claims, No Drawings

AQUEOUS INK FOR INKJET RECORDING

CROSS-REFERENCE TO RELATED APPLICATIONS

This application is based upon and claims the benefit of priority from prior Japanese Patent Application No. 2007-133021, filed May 18, 2007, the entire contents of which are incorporated herein by reference.

BACKGROUND OF THE INVENTION

1. Field of the Invention

This invention relates to an aqueous ink for inkjet recording.

2. Description of the Related Art

Ink comprising various kinds of water-soluble dye dissolved in an aqueous medium has been generally employed as an inkjet recording ink. In recent years, ink comprising a pigment which is dispersed in an aqueous medium has been proposed. The reason is that, as compared with the ink employing water-soluble dye, the ink employing a pigment is excellent in water resistance and in resistance to light.

Many kinds of the conventional ink using pigments are formulated so as to suppress the wetting properties of ink to the surface of paper by mainly limiting the permeability of ink, thereby making it possible to retain the printed ink in the vicinity of the surface of paper and to secure the quality of printing. These kinds of ink however are accompanied with a problem that they are not always applicable to every kinds of paper. More specifically, the bleeding of ink occurs prominently depending on the kinds of paper. Especially, in the case of recycled paper to be manufactured from the mixture of many and unspecified kinds of paper, the difference in wetting properties of ink to the kinds of paper would give a great influence to the generation of bleeding, thereby destabilizing the quality of printing. Further, in the case of conventional pigment ink, it takes a long time for drying printed portions due to the specific nature of ink composition, resulting in the mixing of colors between the neighboring colors especially in multi-color printing such as color printing. Further, there is a problem that since pigment leave on the surface of paper after printing, anti-fretting properties of printed matter are caused to deteriorate.

With a view to overcome these problems, it is proposed in JP-A 9-111165 (KOKAI) and U.S. Pat. No. 5,156,675 to incorporate a glycol ether-based penetrating agent to enhance the permeability of ink to paper. In the case of the conventional pigment ink, it has been generally practiced to disperse pigment in an aqueous medium with a dispersant such as surfactants, polymeric dispersant, etc. The glycol ether-based penetrating agent however is accompanied with problems that it may deteriorate the effects of dispersant and hence, if the glycol ether-based penetrating agent is incorporated in ink at a large content, the dispersion stability of pigment decreases with time.

No one has succeeded as yet to find out an aqueous ink for inkjet recording, which is suited for printing on the ordinary paper, excellent in quick-drying property and in quality of printed images of printed matter, free from clogging of ink during the intermittent discharge of ink, and excellent in dispersion stability with time of pigment.

Incidentally, in the case of volatile oily ink, there has been proposed to employ 3-methoxy-3-methyl-1-butanol as a solvent as disclosed in JP-A 2005-104139 (KOKAI). Since this oil ink is used in an oil ball-point pen, the vapor pressure thereof at 25° C. is regulated to 0.001 mmHg or more.

BRIEF SUMMARY OF THE INVENTION

An object of the present invention is to provide a pigment ink for inkjet recording, which is excellent in dispersion stability of pigment, free from clogging of ink during the intermittent discharge of ink, and excellent in quick-drying property so that it can be used for forming printed images of high-quality on the ordinary paper.

An aqueous ink for inkjet recording according to one aspect of the present invention comprises:
water;
pigment;
a water-soluble organic solvent incorporated at a content of not less than 30% by weight;
a surfactant formed of at least one selected from the group consisting of acetylene glycol-based surfactant and a fluorinated surfactant; and
3-methoxy-3-methyl-1-butanol.

DETAILED DESCRIPTION OF THE INVENTION

Followings are the explanation of embodiments of the present invention.

The aqueous ink for inkjet recording according to one embodiment is featured in that it is constituted by an aqueous solution in which 3-methoxy-3-methyl 1-butanol is incorporated in addition to pigment, a water-soluble organic solvent and a surfactant.

As the kind of pigment to be used, there is not any particular limitation, so that not only inorganic pigment but also organic solvent can be used. As the inorganic pigment, it is possible to employ titanium oxide and iron oxide. Further, it is possible to employ carbon black that can be manufactured by any suitable method such as the contact method, the furnace method or the thermal method.

As the organic pigment, it is also possible to employ, for example, azo pigments (including azo lake, insoluble azo pigment, condensed azo pigment, chelate azo pigment); polycyclic pigments (such as phthalocyanine pigment, perylene pigment, perinone pigment, anthraquinone pigment, quinacridone pigment, dioxazine pigment, thioindigo pigment, isoindolinone pigment, quinophthalone pigment, etc.); dye chelate (for example, basic dye type chelate, acid dye type chelate, etc.); nitro pigments; nitroso pigments; aniline black; etc.

As the carbon black that can be employed in a black ink, examples thereof include: No. 2300, No. 900, MCF88, No. 33, No. 40, No. 45, No. 52, MA7, MA8, MA100 and No. 2200B (Mitsubishi Chemical Co., Ltd.); Raven 5750, Raven 5250, Raven 5000, Raven 3500, Raven 1255 and Raven 700 (Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (Cabot Co., Ltd.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 and Special Black 250 (Dexa Co., Ltd.).

As the pigments that can be employed in a yellow ink, examples thereof include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180 and C.I. Pigment Yellow 185.

As the pigments that can be employed in a magenta ink, examples thereof include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, and C.I. Pigment Violet 19.

Further, as the pigments that can be employed in a cyan ink, examples thereof include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, C. I. Pigment Blue 60, C.I. Vat Blue 4, and C.I. Vat Blue 60.

Since these pigments are used in an ink for inkjet recording, the average particle diameter of pigments should preferably be confined within the range of about 1-300 nm. More preferably, the average particle diameter of pigments should be confined within the range of about 10-200 nm.

The pigments mentioned above can be dispersed in water using a surfactant or a water-soluble resin. Alternatively, these pigments may be used in a state of self-dispersible pigment, enabling them to be dispersed in water without requiring the utilization of a dispersant. Incidentally, the expression of "a state of self-dispersible pigment" means a pigment which is made dispersible in water without requiring the utilization of a dispersant through the surface treatment thereof for enabling at least one kind of functional group selected from carbonyl group, carboxylic group, hydroxyl group and sulfone group or salts thereof to be bonded to the surface of pigment. More specifically, the self-dispersible pigment means a pigment having a functional group or a molecule containing a functional group grafted to the surface of pigment through a vacuum plasma treatment, a diazo-coupling treatment, an oxidation treatment, etc.

These pigments can be generally incorporated in ink at the concentration of solid matters of about 3-20% by weight.

The water-soluble organic solvent acts as so-called wetting agent to prevent the drying of ink. For example, the following organic solvents can be employed as a water-soluble organic solvent.

Namely, they include polyhydric alcohols such as ethylene glycol, diethylene glycol, triethylene glycol, polyethylene glycol, polypropylene glycol, 1,5-pentanediol, 1,6-hexanediol, glycerin (glycerol), 1,2,6-hexanetriol, 1,2,4-butanetriol, 1,2,3-butanetriol, petriol; nitrogen-containing compounds such as N-methyl-2-pyrrolidone, N-hydroxyethyl-2-pyrrolidone, 2-pyrrolidone, 1,3-dimethyl imidazolidinone, ε-caprolactam, etc.; amines such as monoethanol amine, diethanol amine, triethanol amine, monoethyl amine, diethyl amine, triethyl amine, etc.; sulfur-containing compounds such as dimethyl sulfoxide, sulfolane, thiodiethanol, etc.; propylene carbonate; ethylene carbonate; γ-butyrolactone; etc. These organic solvents are also capable of acting to enhance the dissolution stability and can be employed in combination of two or more kinds as required.

Since glycerin is excellent in water-holding property and high in boiling point and hence can be hardly volatilized, at least a part of the water-soluble organic solvent should preferably be glycerin. More specifically, it is preferable that at least 10% by weight of the water-soluble organic solvent is glycerin.

The water-soluble organic solvent can be incorporated in the ink at a content of not less than 30% based on a total weight of the ink. If the content of the water-soluble organic solvent is less than 30% by weight, the water-holding property of the ink would become insufficient, thereby permitting the water contained in the ink existing in the vicinity of delivery nozzle to evaporate and hence resulting in an increase of viscosity and in the flocculation of pigment. In that case, the clogging of nozzle occurs, thereby making it impossible to maintain excellent intermittent discharge performance. On the contrary, when the content of the water-soluble organic solvent is excessively large, the penetration of ink into paper may become too slow, raising the problem that the drying characteristics of ink may be deteriorated. Therefore, the upper limit of the content of the water-soluble organic solvent should desirably be confined to about 60% by weight.

The surfactants are capable of acting as a surface tension-regulating agent, specific examples thereof being selected from acetylene glycol-based surfactants and fluorinated surfactants.

As examples of the acetylene glycol-based surfactants, they include, for example, 2,4,7,9-tetramethyl-5-decine-4,7-diol, 3,6-dimethyl-4-octine-3,6-diol, 3,5-dimethyl-1-hexine-3-ol, etc. More specifically, it is possible to employ Surfynol 104, 82, 465, 485 or TG (Air Products Co., Ltd. U.S.). It is especially preferable to employ Surfynol 465, 104 or TG as they are capable of giving excellent printing quality.

As examples of the fluorinated surfactants, they include, for example, perfluoroalkyl ethylene oxide adducts, perfluoroalkyl amine oxide, perfluoroalkyl carboxylate, perfluoroalkyl sulfonate, etc. In view of obtaining excellent printing quality, it is especially preferable to employ Megafac F-443, F-444, F-470, F494 (Dainippon Ink Chemical Industries); Nobec FC-430, FC-4430 (3M Co., Ltd.); Surfron S-141, S-145, S-111N, S-113 (Seimi Chemicals Co, Ltd.).

Aforementioned acetylene glycol-based surfactants and fluorinated surfactants can be employed singly or in combination of two or more. Among them, it is more preferable to employ fluorinated surfactants since it is possible with the employment of the fluorinated surfactants to lower the surface tension of ink even if the content thereof is very little, to enhance the wettability of the ink to the discharge head, and to suppress the bleeding of printed images.

If the surfactants are incorporated at a content ranging from 0.05 to 1.0% or so based on a total weight of ink, it is possible to enable the surfactants to exhibit the effects thereof.

If needed, salts or nonionic surfactants may be co-used together with the aforementioned surfactants. As the salts, it is possible to employ, for example, polyoxyethylene alkyl ether acetate, dodecylbenzene sulfonate, laurylate, polyoxyethylene alkyl ether sulfate, etc. As the nonionic surfactants, it is possible to employ, for example, polyoxyethylene alkyl ether, polyoxyethylene alkyl ester, polyoxyethylene sorbitan fatty ester, polyoxyethylene alkyl phenyl ether, polyoxyethylene alkyl amine, polyoxyethylene alkyl amide, etc.

In addition to the aforementioned components, 3-methoxy-3-methyl-1-butanol is incorporated in the aqueous ink for inkjet recording according to one embodiment. This 3-methoxy-3-methyl-1-butanol is effective in enabling the droplet of ink that has been delivered onto the surface of paper to be quickly absorbed in the fiber of paper, thereby accelerating the drying of ink and preventing the mixing of colors (bleeding) between neighboring colors during the color printing. Namely, it has been first found out by the present inventors that 3-methoxy-3-methyl-1-butanol is quite suitable for use as a penetrating agent.

Although glycol ether-based solvent has been widely employed up to date as a penetrating agent for the aqueous ink for inkjet recording, there has been a problem in the case of pigment-based ink with respect to the ink-discharging performance. Namely, if the content of glycol ether-based penetrating agent is increased, the dispersion stability of pigment decreases with time.

Whereas, glycol ether-based solvent is effective in greatly enhancing the dispersion stability with time of pigment as well as in suppressing not only the increase of particle diameter but also the increase of viscosity of ink without accompanying the problem of the conventional penetrating agent that the dispersion stability of pigment deteriorates with time. These excellent effects of 3-methoxy-3-methyl-1-butanol may be assumably ascribed to the hydrophobic groups included in 3-methoxy-3-methyl-1-butanol. Namely, the hydrophobic groups included in 3-methoxy-3-methyl-1-butanol are constituted by methyl group and methoxy group and these groups are relatively low in hydrophobicity. In the case of a dispersion system constituted by pigment, a dispersant and water, the adsorption of 3-methoxy-3-methyl-1-butanol onto the hydrophobic surface of pigment is minimal so that there is little possibility to prevent the dispersant from adsorbing onto the pigment. As a result of this, the dispersion system constituted by pigment, a dispersant and water is assumed to be stabilized.

As long as this 3-methoxy-3-methyl-1-butanol is contained in the aqueous ink for inkjet recording of the embodiment, the aforementioned effects can be secured. Even if the content of 3-methoxy-3-methyl-1-butanol is excessively increased, it would be impossible to expect any further prominent enhancement of effects, but rather resulting probably in the deterioration of printing quality. When the content of 3-methoxy-3-methyl-1-butanol is confined within the range of 0.5-20% based on a total weight of ink, it would be possible to enable it to exhibit sufficient functions thereof as a penetrating agent without raising any problems.

If required, the following additives may be incorporated in the ink. Namely, they include a water-soluble resin such as polyvinyl pyrrolidone, alginic acid, etc.; a pH adjustor such as potassium dihydrogenphosphate, disodium hydrogenphosphate, sodium hydroxide, etc.; and a preservative/mildewproofing agent such as sodium benzoate, sodium pentachlorophenol, sodium 2-pyridinethiol-1-oxide, sodium sorbinate, sodium dehydroacetate, and 1,2-dibenzisothiazolin-3-one (Proxel CRL, Proxel BDN, Proxel GXL, Proxel XL-2, Proxel TN available from ICI Co., Ltd.).

These additives are effective in enhancing the quality of printed images and the preservation stability.

Since the aqueous ink according to one embodiment is used for inkjet recording, the aqueous ink is required to have a viscosity which is suitable for the discharging of ink from the nozzle of head of inkjet printer. More specifically, the viscosity of the aqueous ink at 25° C. should preferably be confined to 5-50 mPa·s.

Since the aqueous ink for inkjet recording according to one embodiment is featured in that it contains 3-methoxy-3-methyl 1-butanol as a penetrating agent, the ink is excellent in dispersion stability of pigment and in quick-drying property, thereby making it possible to create printed images of high quality on the ordinary paper. Further, since not less than 30% by weight of a water-soluble organic solvent is incorporated in the ink, it is possible to prevent the generation of clogging of ink even during the intermittent discharging of ink.

Next, specific examples of the present invention will be described together with comparative examples.

EXAMPLE 1

The components described below were mixed together according to the recipe described below and stirred for one hour by a stirrer. Thereafter, the resultant mixture was subjected to filtration using a 1 μm membrane filter to obtain an ink composition of Example 1.

| | |
|---|---|
| Self-dispersible carbon black dispersion | 8.0 wt % |
| (Cabot Speciality Chemicals Ink Co., Ltd.) | |
| (Concentration of solid matters of carbon black) | |
| Glycerin | 30.0 wt % |
| 3-methoxy-3-methyl-1-butanol | 0.5 wt % |
| Surfynol 465 | 1.0 wt % |
| Proxel XL-2 (S) | 0.2 wt % |
| Ion-exchange water | balance |

Further, by repeating the same procedure as described in Example 1, the inks of Examples 2-12 were manufactured.

EXAMPLE 2

| | |
|---|---|
| Self-dispersible carbon black dispersion | 8.0 wt % |
| (Cabot Speciality Chemicals Ink Co., Ltd.) | |
| (Concentration of solid matters of carbon black) | |
| Glycerin | 30.0 wt % |
| Ethylene glycol | 10.0 wt % |
| 3-methoxy-3-methyl-1-butanol | 5.0 wt % |
| Surfynol 465 | 1.0 wt % |
| Proxel XL-2 (S) | 0.2 wt % |
| Ion-exchange water | balance |

EXAMPLE 3

| | |
|---|---|
| Self-dispersible carbon black dispersion | 8.0 wt % |
| (Cabot Speciality Chemicals Ink Co., Ltd.) | |
| (Concentration of solid matters of carbon black) | |
| Glycerin | 5.0 wt % |
| Polyethylene glycol 200 | 0.0 wt % |
| 3-methoxy-3-methyl-1-butanol | 0.0 wt % |
| Surfynol 465 | 1.0 wt % |
| Proxel XL-2 (S) | 0.2 wt % |
| Ion-exchange water | balance |

EXAMPLE 4

| | |
|---|---|
| Self-dispersible carbon black dispersion | 8.0 wt % |
| (Cabot Speciality Chemicals Ink Co., Ltd.) | |
| (Concentration of solid matters of carbon black) | |
| Ethylene glycol | 20.0 wt % |
| Polyethylene glycol 200 | 20.0 wt % |
| 3-methoxy-3-methyl-1-butanol | 5.0 wt % |
| Surfynol 465 | 1.0 wt % |
| Proxel XL-2 (S) | 0.2 wt % |
| Ion-exchange water | balance |

EXAMPLE 5

| | |
|---|---|
| Polymeric dispersant dispersible carbon black dispersion (Fuji Shikiso Co., Ltd.) (Concentration of solid matters of carbon black) | 8.0 wt % |
| Glycerin | 35.0 wt % |
| 3-methoxy-3-methyl-1-butanol | 20.0 wt % |
| Surfynol 465 | 1.0 wt % |
| Proxel XL-2 (S) | 0.2 wt % |
| Ion-exchange water | balance |

EXAMPLE 6

| | |
|---|---|
| Polymeric dispersant dispersible carbon black dispersion (Fuji Shikiso Co., Ltd.) (Concentration of solid matters of carbon black) | 8.0 wt % |
| Glycerin | 35.0 wt % |
| 3-methoxy-3-methyl-1-butanol | 5.0 wt % |
| Surfynol 465 | 1.0 wt % |
| Proxel XL-2 (S) | 0.2 wt % |
| Ion-exchange water | balance |

EXAMPLE 7

| | |
|---|---|
| Polymeric dispersant dispersible carbon black dispersion (Fuji Shikiso Co., Ltd.) (Concentration of solid matters of carbon black) | 8.0 wt % |
| Ethylene glycol | 15.0 wt % |
| Polyethylene glycol 200 | 0.0 wt % |
| 3-methoxy-3-methyl-1-butanol | 5.0 wt % |
| Surfynol 465 | 1.0 wt % |
| Proxel XL-2 (S) | 0.2 wt % |
| Ion-exchange water | balance |

Eaxmple 8

| | |
|---|---|
| Self-dispersible yellow dispersion (Cabot Speciality Chemicals Ink Co., Ltd.) (Concentration of solid matters of yellow pigment) | 6.0 wt % |
| Glycerin | 45.0 wt % |
| 3-methoxy-3-methyl-1-butanol | 5.0 wt % |
| Surfynol 465 | 1.0 wt % |
| Proxel XL-2 (S) | 0.2 wt % |
| Ion-exchange water | balance |

Eaxmple 9

| | |
|---|---|
| Polymeric dispersant dispersible magenta dispersion (Fuji Shikiso Co., Ltd.) (Concentration of solid matters of magenta pigment) | 6.0 wt % |
| Glycerin | 45.0 wt % |
| 3-methoxy-3-methyl-1-butanol | 5.0 wt % |
| Surfynol 465 | 1.0 wt % |
| Proxel XL-2 (S) | 0.2 wt % |
| Ion-exchange water | balance |

Eaxmple 10

| | |
|---|---|
| Polymeric dispersant dispersible cyan dispersion (Fuji Shikiso Co., Ltd.) (Concentration of solid matters of cyan pigment) | 6.0 wt % |
| Glycerin | 45.0 wt % |
| 3-methoxy-3-methyl-1-butanol | 5.0 wt % |
| Surfynol 465 | 1.0 wt % |
| Proxel XL-2 (S) | 0.2 wt % |
| Ion-exchange water | balance |

Eaxmple 11

| | |
|---|---|
| Self-dispersible carbon black dispersion (Cabot Speciality Chemicals Ink Co., Ltd.) (Concentration of solid matters of carbon black) | 8.0 wt % |
| Glycerin | 30.0 wt % |
| 3-methoxy-3-methyl-1-butanol | 0.1 wt % |
| Surfynol 465 | 1.0 wt % |
| Proxel XL-2 (S) | 0.2 wt % |
| Ion-exchange water | balance |

Eaxmple 12

| | |
|---|---|
| Self-dispersible carbon black dispersion (Cabot Speciality Chemicals Ink Co., Ltd.) (Concentration of solid matters of carbon black) | 8.0 wt % |
| Glycerin | 30.0 wt % |
| 3-methoxy-3-methyl-1-butanol | 30.0 wt % |
| Surfynol 465 | 1.0 wt % |
| Proxel XL-2 (S) | 0.2 wt % |
| Ion-exchange water | balance |

In the above Examples 1-12, the surfactant was constituted by Surfynol 465 which was acetylene glycol-based surfactant. The ink compositions of Examples 13-22 were manufactured in the same manner as described in Examples 1-10 excepting that the Surfynol 465 was replaced by Nobec FC-4430 employed as a fluorine-based surfactant. The concentration of Nobec FC-4430 employed as a fluorine-based surfactant was set to 0.2% by weight in all of these examples.

The ink compositions of Examples 23-30 were manufactured in the same manner as described in Examples 1-8 excepting that the aforementioned acetylene glycol-based surfactant was employed together with the aforementioned fluorine-based surfactant. The concentration of Surfynol 465 was set to 0.9% by weight and the concentration of Nobec FC-4430 was set to 0.1% by weight in all of Examples 23-30.

Further, the inks of Comparative Examples 1-8 were manufactured in the same manner as described in Example 1.

COMPARATIVE EXAMPLE 1

| | |
|---|---|
| Self-dispersible carbon black dispersion | 8.0 wt % |
| (Cabot Speciality Chemicals Ink Co., Ltd.) | |
| (Concentration of solid matters of carbon black) | |
| Glycerin | 30.0 wt % |
| Ethylene glycol monobutyl ether | 0.5 wt % |
| Surfynol 465 | 1.0 wt % |
| Proxel XL-2 (S) | 0.2 wt % |
| Ion-exchange water | balance |

COMPARATIVE EXAMPLE 2

| | |
|---|---|
| Self-dispersible carbon black dispersion | 8.0 wt % |
| (Cabot Speciality Chemicals Ink Co., Ltd.) | |
| (Concentration of solid matters of carbon black) | |
| Glycerin | 30.0 wt % |
| Ethylene glycol | 10.0 wt % |
| Diethylene glycol monobutyl ether | 5.0 wt % |
| Surfynol 465 | 1.0 wt % |
| Proxel XL-2 (S) | 0.2 wt % |
| Ion-exchange water | balance |

COMPARATIVE EXAMPLE 3

| | |
|---|---|
| Self-dispersible carbon black dispersion | 8.0 wt % |
| (Cabot Speciality Chemicals Ink Co., Ltd.) | |
| (Concentration of solid matters of carbon black) | |
| Glycerin | 35.0 wt % |
| Polyethylene glycol 200 | 10.0 wt % |
| Triethylene glycol monobutyl ether | 10.0 wt % |
| Surfynol 465 | 1.0 wt % |
| Proxel XL-2 (S) | 0.2 wt % |
| Ion-exchange water | balance |

COMPARATIVE EXAMPLE 4

| | |
|---|---|
| Self-dispersible yellow dispersion | 6.0 wt % |
| (Cabot Speciality Chemicals Ink Co., Ltd.) | |
| (Concentration of solid matters of yellow pigment) | |
| Glycerin | 45.0 wt % |
| Ethylene glycol monobutyl ether | 5.0 wt % |
| Surfynol 465 | 1.0 wt % |
| Proxel XL-2 (S) | 0.2 wt % |
| Ion-exchange water | balance |

COMPARATIVE EXAMPLE 5

| | |
|---|---|
| Polymeric dispersant dispersible magenta dispersion | 6.0 wt % |
| (Fuji Shikiso Co., Ltd.) | |
| (Concentration of solid matters of magenta pigment) | |
| Glycerin | 45.0 wt % |
| Diethylene glycol monobutyl ether | 5.0 wt % |
| Surfynol 465 | 1.0 wt % |
| Proxel XL-2 (S) | 0.2 wt % |
| Ion-exchange water | balance |

COMPARATIVE EXAMPLE 6

| | |
|---|---|
| Polymeric dispersant dispersible cyan dispersion | 6.0 wt % |
| (Fuji Shikiso Co., Ltd.) | |
| (Concentration of solid matters of cyan pigment) | |
| Glycerin | 45.0 wt % |
| Triethylene glycol monobutyl ether | 5.0 wt % |
| Surfynol 465 | 1.0 wt % |
| Proxel XL-2 (S) | 0.2 wt % |
| Ion-exchange water | balance |

COMPARATIVE EXAMPLE 7

| | |
|---|---|
| Self-dispersible carbon black dispersion | 8.0 wt % |
| (Cabot Speciality Chemicals Ink Co., Ltd.) | |
| (Concentration of solid matters of carbon black) | |
| Glycerin | 15.0 wt % |
| Polyethylene glycol 200 | 10.0 wt % |
| 3-methoxy-3-methyl-1-butanol | 5.0 wt % |
| Surfynol 465 | 1.0 wt % |
| Proxel XL-2 (S) | 0.2 wt % |
| Ion-exchange water | balance |

COMPARATIVE EXAMPLE 8

| | |
|---|---|
| Self-dispersible carbon black dispersion | 8.0 wt % |
| (Cabot Speciality Chemicals Ink Co., Ltd.) | |
| (Concentration of solid matters of carbon black) | |
| Ethylene glycol | 15.0 wt % |
| Polyethylene glycol 200 | 10.0 wt % |
| 3-methoxy-3-methyl-1-butanol | 5.0 wt % |
| Surfynol 465 | 1.0 wt % |
| Proxel XL-2 (S) | 0.2 wt % |
| Ion-exchange water | balance |

The ink compositions thus obtained were investigated with respect to the quality of printing, quick-drying property, the resistance to clogging and preservation stability. The evaluation methods employed herein were as follows.

(Quality of Printing)

Using an inkjet recording apparatus mounting thereon a Piezohead (Toshiba Tech Co., Ltd.), the character printing was performed. As the kinds of paper, five kinds of paper, i.e. Toshiba copy paper, Xerox 4024 paper, Richo High-grade paper (type E), Tidal MP paper and NEUSIEDLER paper were used and evaluated.

The characters printed were evaluated visually and the quality of printing such as feathering and strike-through were determined according to the following criteria.

⊚: Excellent quality of printing was indicated in all kinds of paper.

○: Deterioration in quality of printing was recognized only in not more than two kinds of paper.

△: Deterioration in quality of printing was recognized in not less than three kinds of paper.

×: Deterioration in quality of printing was recognized in all kinds of paper.

(Quick-Drying Property)

Using each of the ink compositions and by the aforementioned inkjet recording apparatus, solid printing was performed at a region of 10 mm×10 mm of Toshiba copy paper under the condition of 100 duty. Subsequently, a brand-new Toshiba copy paper was superimposed on the printed portion described above and a weight of 300 g was further placed on the brand-new Toshiba copy paper for 10 seconds. Thereafter, the weight was removed to see if the printed ink was adhered or transferred to the brand-new Toshiba copy paper.

The degree of adhesion of ink to the brand-new Toshiba copy paper 5 seconds after, 10 seconds after, 30 seconds after and 60 seconds after the aforementioned solid printing was examined and determined according to the following criteria.

⊚: No adhesion was recognized 5 seconds after the printing.

○: No adhesion was recognized 10 seconds after the printing.

△: No adhesion was recognized 30 seconds after the printing.

X: Adhesion was recognized 60 seconds after the printing.

(Resistance to Clogging)

Using each of the ink compositions and by the aforementioned inkjet recording apparatus, printing was performed. After the printing, the nozzle was capped and left to stand for one week in an atmosphere kept at a temperature of 25° C. Thereafter, the printing test was resumed to evaluate the resistance to clogging by checking the discharge stability of ink. The criteria employed in this case were as follows.

⊚: Ink-discharging performance was instantly restored without requiring cleaning operation, thereby making it possible to realize stable discharge of ink.

○: In order to restore the ink-discharging performance, not more than two times of cleaning operation were required.

△: In order to restore the ink-discharging performance, not more than five times of cleaning operation were required.

X: It was impossible to restore the ink-discharging performance.

(Preservation Stability)

100 cc of an ink composition was placed in a glass sampling bottle and hermetically sealed. Then, the bottle was preserved in a thermostat heated at a temperature of 65° C. 30 days later, the surface tension and viscosity of the ink composition were measured and, at the same time, the generation of sediment was investigated. The surface tension was measured by a tensiometer CBVP-A3 (Kyowa Kaimen Kagaku Co., Ltd.). The viscosity was measured by a TV-33 type viscometer (Tohki Sangyo Co., Ltd.). With respect to the changes in physical properties such as surface tension and viscosity, when the changes were less than 5% of the initial values, they were determined as being "very small". On the other hand, when the changes were not less than 20% of the initial values, they were determined as being "very large". When the changes were intermediate values falling between them, they were determined as "changed slightly".

Further, with respect to the generation of sediment, it was visually observed and the preservation stability was evaluated according to the following criteria.

○: Changes in physical properties were very small and the generation of sediment was not recognized.

△: Changes in physical properties were admitted slightly and the generation of sediment was also recognized more or less.

X: Changes in physical properties were prominent and the generation of sediment was also prominently admitted.

It is required that at least two of four kinds of evaluations, i.e. the quality of printing, quick-drying property, the resistance to clogging and preservation stability are required to be "⊚" and also any one of these four kinds of evaluations should not be marked by "×". Therefore, if these conditions were not met, the ink composition was deemed as being NG. The results thus obtained are shown in Tables 1 and 2.

TABLE 1

|  | Printed quality | Quick-drying | Resistance to clogging | Preservation stability |
| --- | --- | --- | --- | --- |
| Ex. 1 | ⊚ | ○ | ⊚ | ○ |
| Ex. 2 | ⊚ | ⊚ | ⊚ | ○ |
| Ex. 3 | ○ | ⊚ | ⊚ | ○ |
| Ex. 4 | ○ | ⊚ | ⊚ | ○ |
| Ex. 5 | ○ | ⊚ | ⊚ | ○ |
| Ex. 6 | ⊚ | ⊚ | ⊚ | ○ |
| Ex. 7 | ○ | ⊚ | ⊚ | ○ |
| Ex. 8 | ⊚ | ⊚ | ⊚ | ○ |
| Ex. 9 | ⊚ | ⊚ | ⊚ | ○ |
| Ex. 10 | ⊚ | ⊚ | ⊚ | ○ |
| Ex. 11 | ⊚ | △ | ⊚ | ○ |
| Ex. 12 | △ | ⊚ | ⊚ | ○ |
| Ex. 13 | ⊚ | ○ | ⊚ | ⊚ |
| Ex. 14 | ⊚ | ⊚ | ⊚ | ⊚ |
| Ex. 15 | ⊚ | ⊚ | ⊚ | ○ |
| Ex. 16 | ⊚ | ⊚ | ⊚ | ○ |
| Ex. 17 | ⊚ | ⊚ | ⊚ | ○ |
| Ex. 18 | ⊚ | ⊚ | ⊚ | ⊚ |
| Ex. 19 | ⊚ | ⊚ | ⊚ | ○ |
| Ex. 20 | ⊚ | ⊚ | ⊚ | ○ |
| Ex. 21 | ⊚ | ⊚ | ⊚ | ⊚ |
| Ex. 22 | ⊚ | ⊚ | ⊚ | ⊚ |
| Ex. 23 | ⊚ | ○ | ⊚ | ⊚ |
| Ex. 24 | ⊚ | ⊚ | ⊚ | ○ |
| Ex. 25 | ○ | ⊚ | ⊚ | ○ |
| Ex. 26 | ⊚ | ⊚ | ⊚ | ○ |
| Ex. 27 | ○ | ⊚ | ⊚ | ○ |
| Ex. 28 | ⊚ | ⊚ | ⊚ | ⊚ |
| Ex. 29 | ⊚ | ⊚ | ⊚ | ○ |
| Ex. 30 | ⊚ | ⊚ | ⊚ | ○ |

TABLE 2

|  | Printed quality | Quick-drying | Resistance to clogging | Preservation stability |
| --- | --- | --- | --- | --- |
| Comp. Ex. 1 | ⊚ | △ | △ | △ |
| Comp. Ex. 2 | ⊚ | ○ | ○ | △ |
| Comp. Ex. 3 | ○ | ○ | △ | X |
| Comp. Ex. 4 | ⊚ | ⊚ | ○ | X |
| Comp. Ex. 5 | ⊚ | ⊚ | ○ | X |
| Comp. Ex. 6 | ⊚ | ⊚ | ○ | X |
| Comp. Ex. 7 | ⊚ | ⊚ | X | ○ |
| Comp. Ex. 8 | ⊚ | ⊚ | X | ○ |

As shown in Table 1, the ink compositions of these examples all indicated excellent results with respect to every evaluations, i.e. the quality of printing, quick-drying property, the resistance to clogging and preservation stability. Especially, when the content of 3-methoxy-3-methyl-1-butanol was confined to the range of 0.5-20% by weight, it was possible to realize excellent quick-drying property as well as high quality of printing.

Whereas, in the cases where 3-methoxy-3-methyl-1-butanol was not contained in the ink composition, it was impossible to enhance the resistance to clogging and preservation stability as indicated by the results of Comparative Examples 1-6. Further, in the cases where the content of the water-soluble organic solvent was less than 30% by weight, the resistance to clogging was caused to deteriorate as clearly seen from the results of Comparative Examples 7 and 8.

The aqueous ink for inkjet recording according of the embodiment, which contains 3-methoxy-3-methyl-1-butanol in addition to pigment, a prescribed quantity of a water-soluble organic solvent and a specific kind of a surfactant, is excellent in dispersion stability of pigment and in quick-drying property, so that it is possible to obtain printed images of high quality on the ordinary paper without generating the clogging of ink even during the intermittent discharge of ink. Namely, the aqueous ink for inkjet recording according of the embodiment is considered as being excellent in every respect.

According to the present invention, it is possible to provide a pigment ink for inkjet recording, which is excellent in dispersion stability of pigment, free from clogging of ink during the intermittent discharge of ink, and excellent in quick-drying property so that it can be used for forming printed images of high-quality on the surface of ordinary paper.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An aqueous ink for inkjet recording comprising:
water;
pigment;
a water-soluble organic solvent incorporated at a content of not less than 30% by weight;
a surfactant formed of at least one selected from the group consisting of acetylene glycol-based surfactant and a fluorinated surfactant; and
3-methoxy-3-methyl-1-butanol;
wherein at least a part of the water-soluble organic solvent is glycerin.

2. The aqueous ink according to claim 1, wherein the pigment has an average particle diameter ranging from 1 to 300 nm.

3. The aqueous ink according to claim 1, wherein the pigment has an average particle diameter ranging from 10 to 200 nm.

4. The aqueous ink according to claim 1, wherein the pigment is bonded, on the surface thereof, with at least one kind of functional group selected from the group consisting of carbonyl group, carboxylic group, hydroxyl group and sulfone group or salts thereof.

5. The aqueous ink according to claim 1, wherein the pigment is contained at a concentration of solid matters of 3-20% by weight.

6. The aqueous ink according to claim 1, wherein the water-soluble organic solvent is contained at a content of not more than 60% based on a total weight of the ink.

7. The aqueous ink according to claim 1, wherein the water-soluble organic solvent is selected from the group consisting of ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol, petriol, N-methyl-2-pyrrolidone, N-hydroxyethyl-2-pyrrolidone, 2-pyrrolidone, 1,3-dimethyl imidazolidinone, ε-caprolactam, monoethanol amine, diethanol amine, triethanol amine, monoethyl amine, diethyl amine, triethyl amine, dimethyl sulfoxide, sulfolane, thiodiethanol, propylene carbonate, ethylene carbonate and γ-butyrolactone.

8. The aqueous ink according to claim 1, wherein at least 10% by weight of the water-soluble organic solvent is glycerin.

9. The aqueous ink according to claim 1, wherein the surfactant is contained at a content ranging from 0.05% to 1.0% based on a total weight of the ink.

10. The aqueous ink according to claim 1, wherein the acetylene glycol-based surfactant is selected from the group consisting of 2,4,7,9-tetramethyl-5-decine-4,7-diol, 3,6-dimethyl-4-octine-3,6-diol, 3,5-dimethyl-1-hexine-3-ol.

11. The aqueous ink according to claim 1, wherein the fluorinated surfactant is selected from the group consisting of perfluoroalkyl ethylene oxide adducts, perfluoroalkyl amine oxide, perfluoroalkyl carboxylate and perfluoroalkyl sulfonate.

12. The aqueous ink according to claim 1, wherein the surfactant is a fluorinated surfactant.

13. The aqueous ink according to claim 1, wherein the ink has a viscosity of not higher than 50 mPa·s at 25°C.

14. The aqueous ink according to claim 1, wherein the ink has a viscosity of 5-50 mPa·s at 25°C.

15. The aqueous ink according to claim 1, further comprising salts.

16. The aqueous ink according to claim 15, wherein the salts are selected from the group consisting of polyoxyethylene alkyl ether acetate, dodecylbenzene sulfonate, laurylate and polyoxyethylene alkyl ether sulfate.

17. The aqueous ink according to claim 1, further comprising a nonionic surfactant.

18. The aqueous ink according to claim 17, wherein the nonionic surfactant is selected from the group consisting of polyoxyethylene alkyl ether, polyoxyethylene alkyl ester, polyoxyethylene sorbitan fatty ester, polyoxyethylene alkyl phenyl ether, polyoxyethylene alkyl amine and polyoxyethylene alkyl amide.

19. The aqueous ink according to claim 1, wherein the 3-methoxy-3-methyl-1-butanol is contained therein at a content ranging from 0.5% to 20% based on a total weight of the ink.

* * * * *